United States Patent
Sanzone et al.

(10) Patent No.: US 9,858,222 B2
(45) Date of Patent: Jan. 2, 2018

(54) REGISTER ACCESS CONTROL AMONG MULTIPLE DEVICES

(71) Applicant: Cavium, Inc., San Jose, CA (US)

(72) Inventors: Robert A. Sanzone, Hudson, MA (US); Wilson P. Snyder, II, Holliston, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 513 days.

(21) Appl. No.: 14/540,414

(22) Filed: Nov. 13, 2014

(65) Prior Publication Data

US 2016/0140065 A1    May 19, 2016

(51) Int. Cl.
G06F 13/364 (2006.01)
G06F 13/42 (2006.01)
G06F 13/37 (2006.01)

(52) U.S. Cl.
CPC ............ *G06F 13/364* (2013.01); *G06F 13/37* (2013.01); *G06F 13/4282* (2013.01)

(58) Field of Classification Search
CPC ................................. H04L 12/40; G06F 13/00
USPC ......................................................... 710/110
See application file for complete search history.

(56) References Cited

U.S. PATENT DOCUMENTS

| | | | | |
|---|---|---|---|---|
| 4,463,421 A * | 7/1984 | Laws | ...................... | G06F 13/38 710/46 |
| 5,038,282 A * | 8/1991 | Gilbert | ................ | G06F 9/30065 712/14 |
| 6,463,072 B1 * | 10/2002 | Wolrich | .................. | H04L 49/90 370/439 |
| 7,743,191 B1 * | 6/2010 | Liao | ..................... | G06F 13/1663 710/240 |
| 2003/0043790 A1 * | 3/2003 | Gutierrez | ............ | G06F 17/5045 370/362 |

* cited by examiner

*Primary Examiner* — Titus Wong
(74) *Attorney, Agent, or Firm* — Hamilton, Brook, Smith & Reynolds, P.C.

(57) ABSTRACT

A circuit manages and controls access requests to a register, such as a control and status register (CSR) among a number of devices. In particular, the circuit selectively forwards or suspends off-chip access requests and forwards on-chip access requests independent of the status of off-chip requests. The circuit receives access requests at a plurality of buses, one or more of which can be dedicated to exclusively on-chip requests and/or exclusively off-chip requests. Based on the completion status of previous off-chip access requests, further off-chip access requests are selectively forwarded or suspended, while on-chip access request are sent independently of off-chip request status.

15 Claims, 4 Drawing Sheets

REGISTER ACCESS CONTROL AMONG MULTIPLE DEVICES

BACKGROUND

A control and status register (CSR) is a register typically implemented in data processors to store information regarding instructions and status conditions of various devices. Several components or devices of a data processor may each have a respective CSR, and several CSRs can occupy a common memory within the data processor. In certain data processing applications, multiple devices may access the CSRs to reference and update instruction and status information.

SUMMARY

Example embodiments of the present disclosure include a circuit configured to manage and control access requests to a register among a number of devices. The circuit may include a first set of ports that connect to on-chip devices via respective buses, where one or more of the buses is configured to carry on-chip access requests, and one or more buses is configured to carry off-chip access requests. A second set of ports connect to control status registers (CSRs) via a master bus. A control circuit operates to detect the completion status of access requests, including off-chip access requests. Based on the completion status of an off-chip request, a subsequent off-chip request can be selectively forwarded or suspended. Further, an on-chip access request may be forwarded to the CSRs independent of the completion status.

In further embodiments, an interface circuit may be connected to the control circuit via the master bus. The interface circuit may forward the off-chip access requests to the off-chip device. The interface circuit may further operate to forward the completion status to the control circuit, and/or may update a register based on a signal received from the off-chip device, where the register indicates the completion status.

In still further embodiments, the control circuit may provide a backpressure signal to suspend access requests on the second bus based on the completion status. Access requests from each of a number of buses to the circuit may be received to a respective buffer (e.g., a FIFO). To accommodate a particular application, a number of buses carrying access requests may be dedicated to carry exclusively on-chip or exclusively off-chip requests, while other buses may carry both on-chip and off-chip requests. The control circuit may operate to select and/or order on-chip requests from the buses bases on a selection procedure such as a round-robin selection.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments follows.

Figure 1:
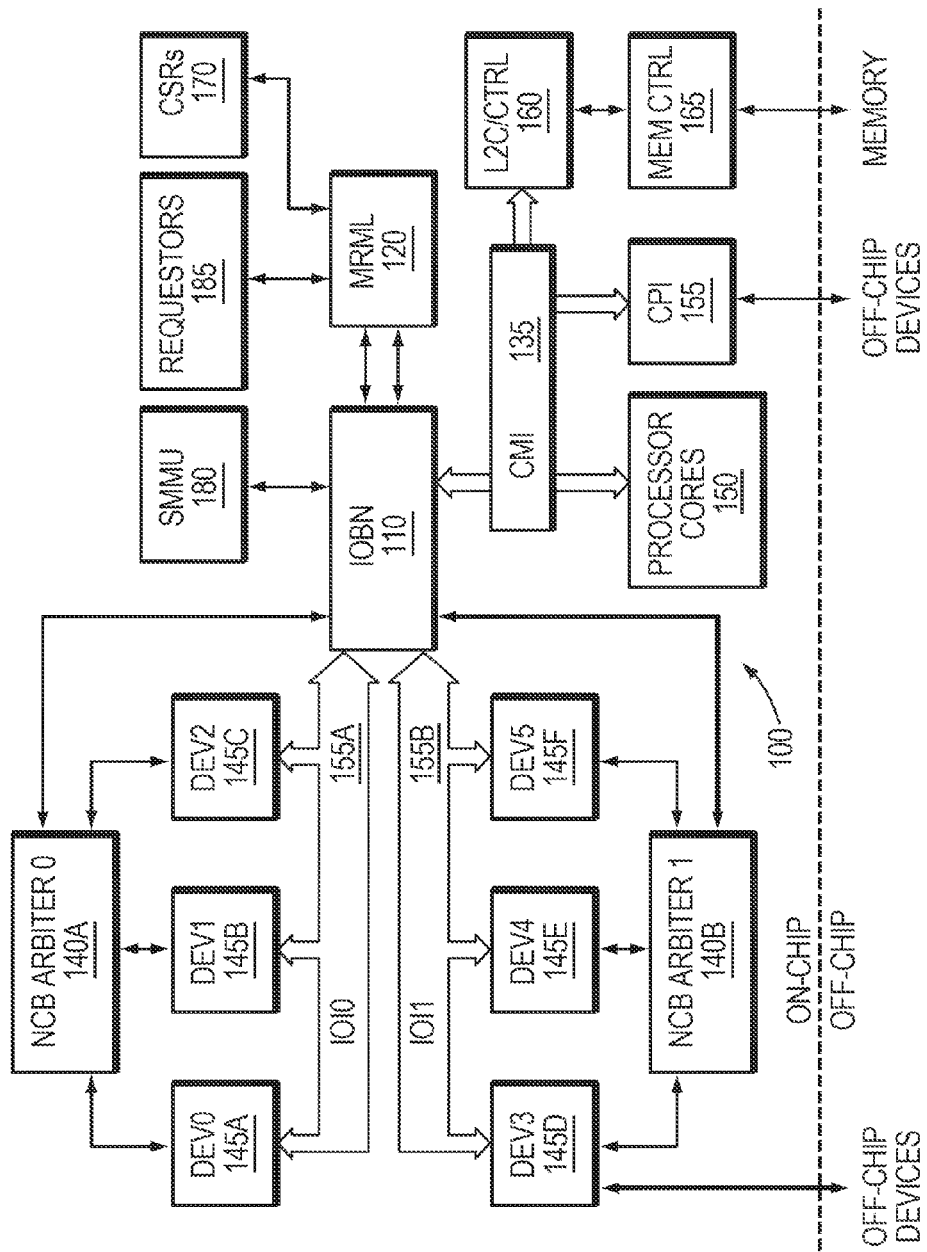
FIG. 1 is a block diagram illustrating a data processor in which embodiments of the present disclosure may be implemented.

FIG. 1 is a block diagram illustrating a data processor 100 in an example embodiment. The processor 100 may be implemented as a system-on-chip (SOC) and connected to external devices, resources and communications channels via a printed circuit board (PCB). Alternatively, the processor 100 may be implemented among a number of discrete circuit components connected via a PCB, or may comprise a SOC in combination with one or more discrete circuit components.

The data processor 100 facilitates operations between a number of devices and resources, and arbitrates access to shared resources among the devices. In particular, the processor cores 150 may include one or more data processor cores. In an example embodiment, the processor cores 150 may include a number (e.g., 48) of ARM® processor cores, such as the ARMv8 processor cores. The processor cores 150 are connected, via a coherent memory interconnect (CMI) 135, to provide shared access to a number of other devices and resources, including the level-2 cache (L2C) and controller 160 (also referred to herein as "L2C"). The L2C further connects to a memory controller 165 for performing memory access operations to an external memory, such as a double data rate synchronous dynamic random-access memory (DDR SDRAM) array. Such a memory (not shown) may alternatively be located on-chip with the data processor 100. The CMI 135 may also connect to a coherent processor interconnect (CPI) 155 for communication with off-chip devices, such as an additional data processor. An example of one such configuration is described below with reference to FIG. 2.

The CMI 135 is further connected to an input/output bridge (IOBN) 110, which provides an interconnect between the processor cores 150, CPI 155 and L2C 160 and additional devices and resources. In particular, devices 145A-F connect to the IOBN 110 via input/output interconnects (IOI), IOI0 155A and IOI1 155B, which may be non-coherent buses (NCBs) including passive and/or arbitrated channels. The devices 145A-F may include a number of different on-chip devices, such as co-processors, and may include I/O interfaces (e.g., USB, SATA, PCIe, Ethernet) to connect to a number of external or off-chip devices and interfaces. In order to arbitrate resources at the IOBN 110 to the devices 145A-F, NCB arbiters 140A-B receive requests from the devices 145A-F and selectively grant IOBN resources to the devices 145A-B. Once granted, the devices 145A-B may communicate with the processor cores 150, perform a memory access operation to the L2C 160, or access other components of the data processor 100.

In order to facilitate shared memory access among several different devices (e.g., the processor cores 150 and devices 145A-F), the data processor 100 may employ virtualization, whereby a memory interconnect (e.g., CMI 135 and IOBN 110) interfaces with the devices using virtual addresses, which are translated to a physical address of the memory. To enable virtualization, a System Memory Management Unit (SMMU) 180 maintains an index of physical and virtual addresses. During a memory access operation where a virtual address is provided, the IOBN 110 forwards the virtual address to the SMMU 180, which returns a corresponding physical address for accessing the memory (e.g., the L2C 160 or an external memory via the L2C 160). The IOBN 110 may translate addresses bi-directionally such that the virtual address is maintained at communications at the device, and the physical address is indicated in operations at the memory. The SMMU 180 may be further configured to support multiple tiers of virtual addresses.

Control status registers (CSRs) 170 include registers for maintaining information about the instructions and operations of the data processor 100. The CSRs may maintain, for example, status information regarding a number of devices, as well as information about ongoing operations and instructions between devices and/or resources. Devices such as the processor cores 150 and the devices 145A-B, as well as other requestors 185 and off-chip devices (via the CPI 155), may write to and read from the CSRs 170 using a register master logic (RML). To facilitate the multiple requests from several different devices, a master RML (MRML) 120 operates to arbitrate access to the CSRs 170.

Figure 2:
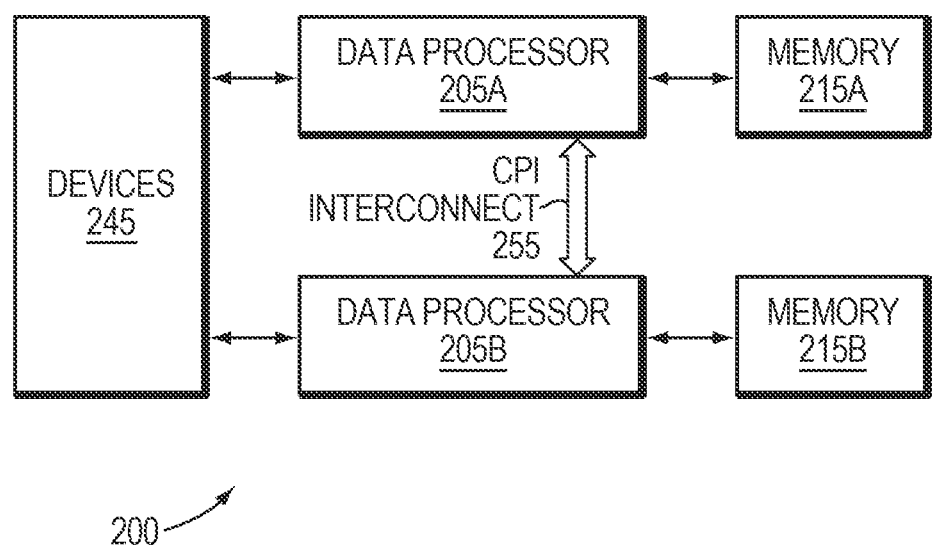
FIG. 2 is a block diagram illustrating a system implementing the data processor of FIG. 1.

FIG. 2 is a block diagram illustrating a system 200 implementing a plurality of data processors. The system 200 includes data processors 205A-B, each of which may be configured comparably to the data processor 100 described above with reference to FIG. 1. The data processors 205A-B may be linked by a CPI interconnect 255, which may connect to a respective CPI interface (e.g., 155 in FIG. 1) of each data processor 205A-B. The CPI interconnect 255 may provide shared access to the devices and resources across the data processors 201A-B. In further embodiments, additional data processors or other devices may be linked to the data processors 205A-B via the CPI interconnect 255.

The data processors 205A-B may be connected to respective memory arrays (e.g., DDR SDRAM) 215A-B as shown, and/or may be connected to a common memory array. The data processors may be further connected to a number of external devices 245 via a number of devices via respective I/O interfaces (e.g., USB, SATA, PCIe, Ethernet).

Turning back to FIG. 1, in some embodiments, the data processor 100 may enable multiple devices to access and write to registers of the CSRs 170 in the course of various operations. Devices such as the processor cores 150 and the devices 145A-B, as well as other requestors 185 and off-chip devices (via the CPI 155), may write to and read from the CSRs 170 using a RML channel. To facilitate the multiple requests from several different devices, the MRML 120 operates to arbitrate access to the CSRs 170 and off-chip requests.

Requests from several devices to the common CSRs 170 must be arbitrated to ensure access to all devices. Further, in some applications, the MRML 120 may be communicating with an off-chip MRML via the CPI 155 (e.g., in a multiple-processor configuration as shown in FIG. 2). In such an application, the MRML 120 may permit only one in-flight RML request (or one in-flight off-chip request) at a given time. Thus, if two MRMLs across two data processors forward a second request to one another while a first request is still pending, or alternatively, if one MRML sends both the first and second off-chip requests before completing the first request, a "deadlocking" condition can occur, blocking further requests from being completed.

In an example embodiment, the MRML 120 is configured to manage and control access requests to the CSRs 170 among a number of devices. In particular, the MRML may selectively forwards or suspends off-chip access requests and forwards on-chip access requests independent of the status of off-chip requests. The MRML may receive access requests at a plurality of buses, one or more of which can be dedicated exclusively to on-chip requests and/or exclusively to off-chip requests. Based on the completion status of previous off-chip access requests, the MRML 120 may selectively forward or suspend further off-chip access requests, while on-chip access request may be sent independently of off-chip request status.

An example MRML 120 configured to provide the aforementioned functions is described below with reference to FIG. 3.

Figure 3:
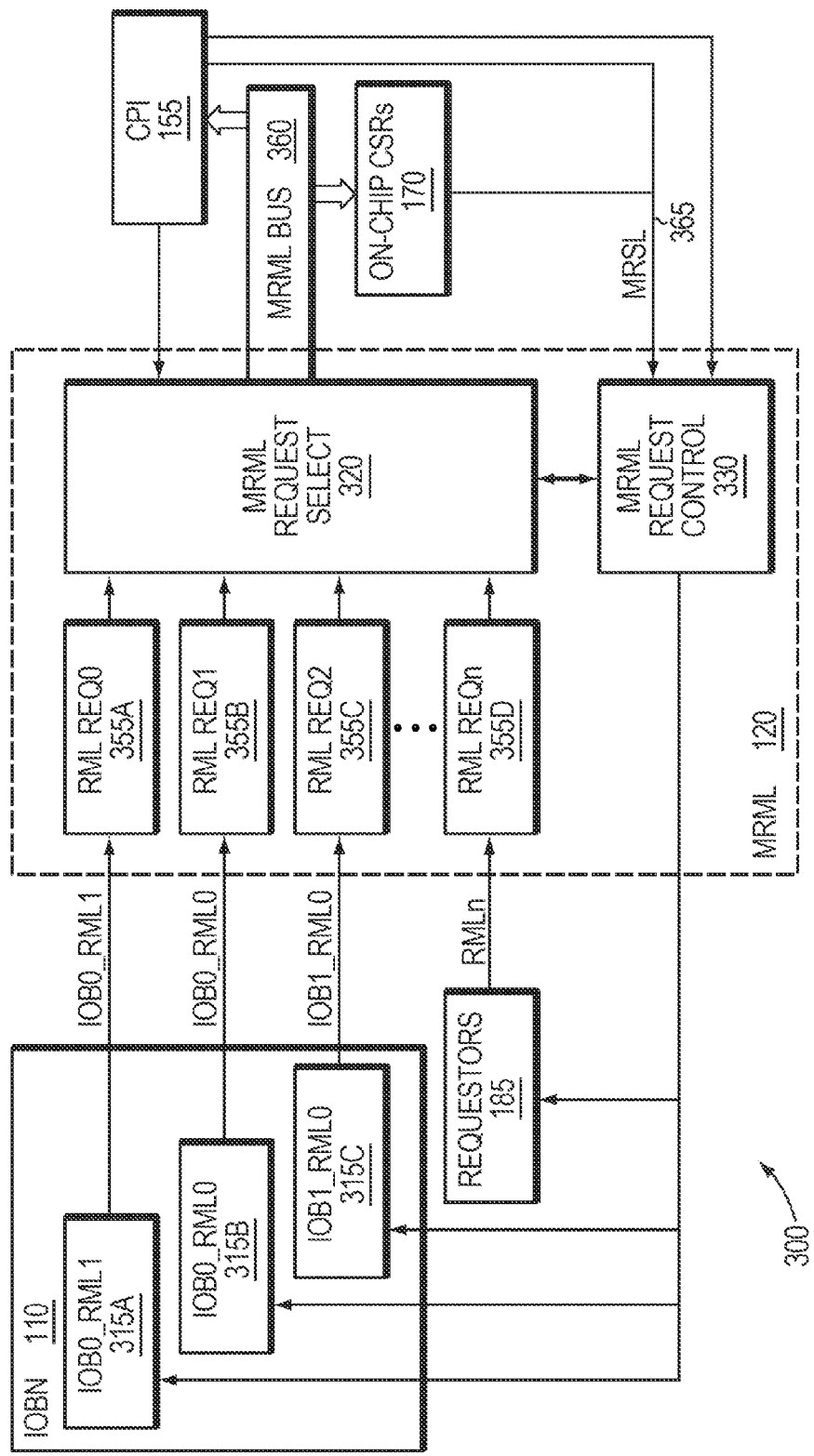
FIG. 3 is a block diagram illustrating an master RML circuit and associated components in one embodiment.

FIG. 3 is a block diagram illustrating a processing subsystem 300 including an MRML 120 connecting an IOBN 110, a CPI 155 and CSRs 170 in one embodiment. The subsystem 300 may include one or more components of the data processor 100 described above with reference to FIG. 1, or may be incorporated into the data processor. For example, the subsystem 300 may also include processor cores 150 and process access requests from the processor cores 150 as well as from the devices (e.g., devices 145A-F) connected to the IOBN 110.

The IOBN 110 may receive requests to access the CRSs 170 (also referred to as a "RML request," entailing a read or write operation to a register) at buffers 315A-C (e.g., FIFOs). Each buffer 315A-C may correspond to a given RML channel connecting to a plurality of devices via a bus (e.g., devices 145A-F via IOI buses 155A-B as shown in FIG. 1), and further connecting to the MRML 120 via the IOBN 110. The IOBN 110 forwards RML requests at each of the buffers 315A-C to the MRLM 120 through a respective RML channel. Further, additional devices within the sub-assembly 300 may access the CSRs 170. These additional devices are referred to as requestors 185, and may forward requests to the MRML 120 via an additional RML channel.

The MRML 120 receives the RML requests from each RML channel to a respective buffer 355A-D. A request select circuit 320 operates to select a next RML request from among the requests occupying the buffers 355A-D, and forwards the RML requests to MRML bus 360, through which the requests may access the CSRs 170 and/or an off-chip device (e.g. an off-chip MRML or memory) via the CPI 155. The CSRs 170 and CPI 155 may forward messages, such as responses to such requests, via the master register slave logic (MRSL) bus 365, which are received to the request control circuit 330. The control circuit 330 may operate to return RSL messages to a requesting device, and may issue backpressure commands (e.g., to the IOBN 110, requestors 185, or other requesting devices) to suspend further transmission of requests on a given RML channel. Alternatively, the operations of the select circuit and control circuit may be provided by a single control circuit.

To facilitate completion of both on-chip and off-chip requests while avoiding conflicts or a "deadlock" condition, a particular one or more RML channels (e.g., channel IOB0_RML1, received to buffer 355A) may be dedicated to carry exclusively on-chip RML requests, while other RML channels (e.g., IOB0_RML0, IOB1_RML0) carry both on-chip and off-chip requests. When a first request from a given RML channel has a target that is off-chip, the select circuit 320 may suspend any further off-chip requests until the first request is confirmed to be completed (e.g., queued at an off-chip site). However, on-chip RML requests, in particular RML requests received from the dedicated on-chip RML channel, may be forwarded while the off-chip request is pending. The CPI 155 may inform the select circuit 320 when the CPI 155 can accept a new off-chip request following the completion of a previous request. The CPI 155 may also inform the MRML 120 when the CPI 155 has previously requested read data (e.g., from a previous off-chip request) available for reading.

Figure 4:
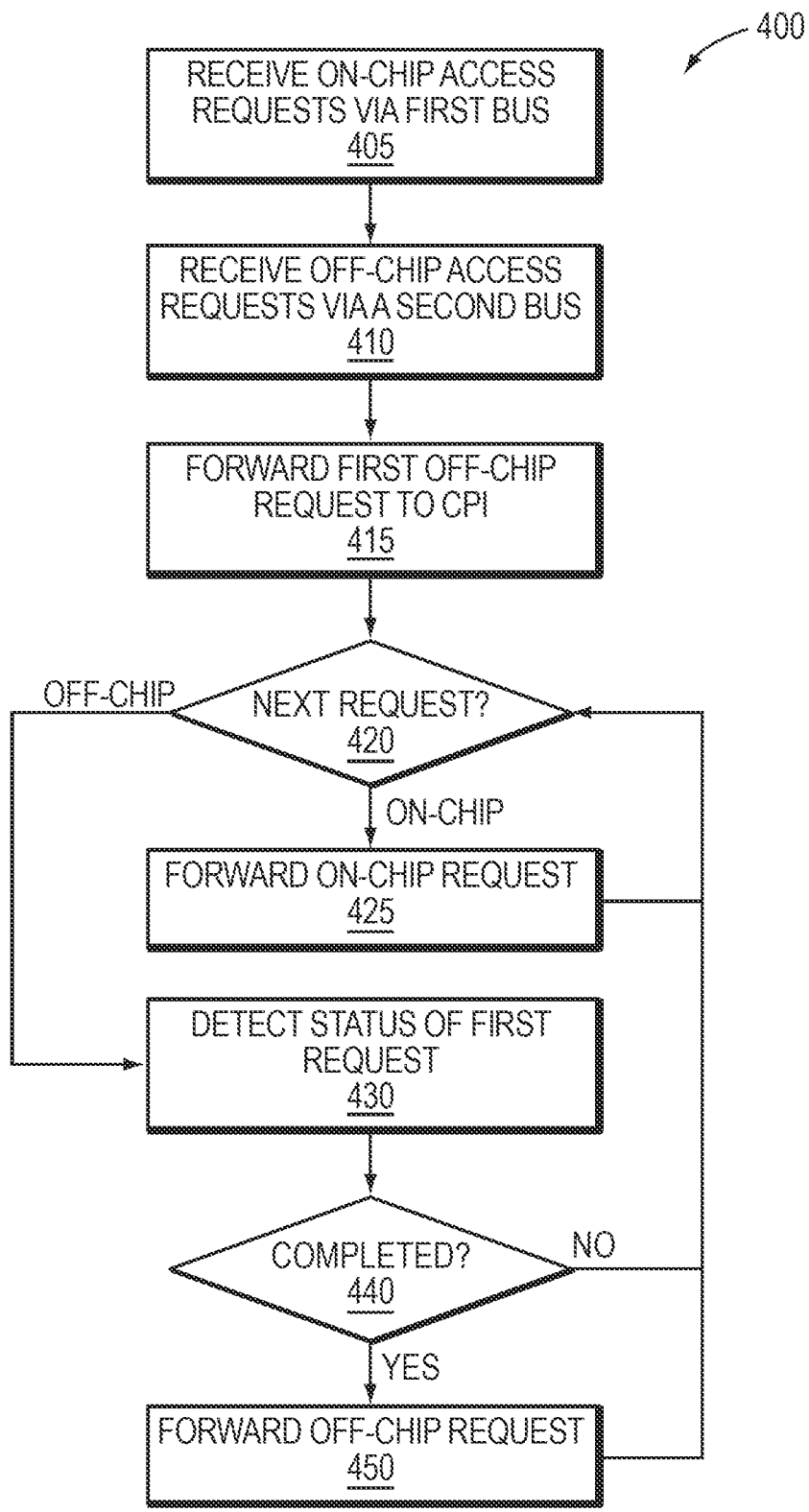
FIG. 4 is a flow diagram illustrating a process of arbitrating requests according to an example embodiment.

FIG. 4 is a flow chart illustrating an example process 400 of processing and selecting RML requests in one embodiment. With reference to FIG. 3, the MRML 120 may receive on-chip access requests via a first bus (e.g., IOB0_RML1) (405), and may receive off-chip access requests via a second bus (e.g., IOB0_RML0) (410). The select circuit 320 may forward a first off-chip request to the CPI 155 for further forwarding to the corresponding off-chip target (415). The select circuit 320 may then select a next request according to a selection routine, such as a round-robin selection among the RML channels (420).

If the next request is directed to an on-chip target (and may be received from the first bus), then the on-chip request is forwarded to the on-chip target, such as the CSRs 170, for completion (425). If the next request is a second off-chip request, then the select circuit 320 may detect the status of the first request as indicated by the CPI 155 (430), and selectively forward or suspend the second off-chip access request (440). Specifically, if the first request is completed, then the MRML 120 may forward the second off-chip request to the CPI 155 (450). Conversely, if the first request is not completed, then the MRML 110 may suspend the request and proceed to a next request according to the selection routine (420). In response to detecting a pending off-chip request, the control circuit 330 may also issue backpressure commands directed to one or more of the RML buses that carry off-chip requests.

While this invention has been particularly shown and described with references to example embodiments thereof, it will be understood by those skilled in the art that various changes in form and details may be made therein without departing from the scope of the invention encompassed by the appended claims.

What is claimed is:

1. A circuit comprising:
   a first plurality of ports for connecting to a plurality of on-chip devices via respective buses, a first bus of the respective buses configured to carry on-chip access requests, a second bus of the respective buses configured to carry off-chip access requests;
   a second plurality of ports connecting to a master bus, the master bus further connecting to a control status register (CSR) and an off-chip device; and
   a control circuit configured to:
   detect a completion status of a first off-chip access request received from the second bus, the first off-chip access request being a request to access the off-chip device via the master bus;
   selectively forward, based on the completion status, a second off-chip access request to the master bus the second off-chip access request being a request to access the off-chip device via the master bus; and
   forward, to the master bus, an on-chip access request received from the first bus, the on-chip access request being a register master logic (RML) request to write to the CSR, the control circuit forwarding the on-chip access request independent of the completion status.

2. The circuit of claim 1, further comprising an interface circuit connected to the control circuit via the master bus, the interface circuit configured to forward the first and second off-chip access requests to the off-chip device.

3. The circuit of claim 2, wherein the interface circuit is further configured to update a register based on a signal received from the off-chip device, the register indicating the completion status.

4. The circuit of claim 2, wherein the interface circuit is further configured to forward the completion status to the control circuit.

5. The circuit of claim 1, wherein the control circuit is further configured to forward a backpressure signal to suspend access requests on the second bus based on the completion status.

6. The circuit of claim 1, further comprising first and second buffers for receiving access requests via the first and second buses, respectively.

7. The circuit of claim 1, further including a third bus of the respective buses, the third bus configured to carry on-chip access requests.

8. The circuit of claim 7, wherein the control circuit is configured to order on-chip requests from the first, second and third buses based on a round-robin selection.

9. A method comprising:
   receiving a plurality of on-chip access requests via a first bus;
   receiving first and second off-chip access requests via a second bus;
   forwarding the first off-chip access request to a control and status register (CSR) via a master bus;
   detecting a completion status of the first off-chip access request received from the second bus, the first off-chip access request being a request to access the off-chip device via the master bus;
   selectively forwarding, based on the completion status, a second off-chip access request to the master bus, the second off-chip access request being a request to access the off-chip device via the master bus; and
   forwarding, to the CSR via the master bus, the plurality of on-chip access requests received from the first bus independent of the completion status the plurality of on-chip access requests being register master logic (RML) requests to write to the CSR.

10. The method of claim 9, further comprising forwarding the first and second off-chip access requests to the off-chip device.

11. The method of claim 10, further comprising updating a register based on a signal received from the off-chip device, the register indicating the completion status.

12. The method of claim 9, further comprising forwarding a backpressure signal to suspend access requests on the second bus based on the completion status.

13. The method of claim 9, further comprising receiving the access requests from the first and second buses to first and second buffers, respectively.

14. The method of claim 9, further comprising receiving access requests from a third bus configured to carry on-chip access requests.

15. The method of claim 14, further comprising ordering on-chip requests from the first, second and third buses based on a round-robin selection.

* * * * *